(12) United States Patent
Montgomery

(10) Patent No.: US 7,006,666 B2
(45) Date of Patent: Feb. 28, 2006

(54) METHOD AND APPARATUS FOR DETECTING AND REACTING TO OCCURRENCE OF AN EVENT

(75) Inventor: Dennis L. Montgomery, Reno, NV (US)

(73) Assignee: eTreppid Technologies, LLC, Reno, NV (US)

( * ) Notice: Subject to any disclaimer, the term of this patent is extended or adjusted under 35 U.S.C. 154(b) by 673 days.

(21) Appl. No.: 09/990,868

(22) Filed: Nov. 21, 2001

(65) Prior Publication Data

US 2003/0095686 A1    May 22, 2003

(51) Int. Cl.
*G06K 9/00*     (2006.01)
(52) U.S. Cl. .................... 382/103; 382/118; 348/143; 370/395.64
(58) Field of Classification Search ........ 382/103–107, 382/115, 116, 123, 151, 154, 159, 162, 166, 382/170, 173, 177, 181, 184, 189–190, 194, 382/197, 199, 203, 209, 224, 232, 239, 243, 382/248, 253, 254, 276, 297, 305, 309, 312, 382/118; 340/539.1, 572.4; 386/68, 123; 370/395.64, 395.1; 348/143, 150, 155, 579, 348/620; 345/720; 352/66; 356/3.16
See application file for complete search history.

(56) References Cited

U.S. PATENT DOCUMENTS

| | | | | | |
|---|---|---|---|---|---|
| 4,120,004 | A | * | 10/1978 | Coutta | 348/150 |
| 4,233,631 | A | * | 11/1980 | Mahler | 348/579 |
| 4,841,366 | A | * | 6/1989 | Katagiri et al. | 348/620 |
| 5,471,239 | A | * | 11/1995 | Hill et al. | 348/155 |
| 5,844,482 | A | * | 12/1998 | Guthrie et al. | 340/572.4 |
| 5,901,246 | A | * | 5/1999 | Hoffberg et al. | 382/209 |
| 6,011,901 | A | * | 1/2000 | Kirsten | 386/123 |
| 6,434,320 | B1 | * | 8/2002 | Orth et al. | 386/68 |
| 6,462,656 | B1 | * | 10/2002 | Ulrich et al. | 340/539.1 |
| 6,757,008 | B1 | * | 6/2004 | Smith | 348/143 |
| 6,810,134 | B1 | * | 10/2004 | Wilinski et al. | 382/107 |

FOREIGN PATENT DOCUMENTS

WO    WO 01/20489    3/2001

\* cited by examiner

*Primary Examiner*—Bhavesh M. Mehta
*Assistant Examiner*—Seyed Azarian
(74) *Attorney, Agent, or Firm*—Pillsbury Winthrop Shaw Pittman, LLP

(57) ABSTRACT

A method of detecting occurrence of an event. The method includes comparing a first compressed frame size to a later compressed frame size to determine the occurrence of an event.

8 Claims, 5 Drawing Sheets

METHOD AND APPARATUS FOR DETECTING AND REACTING TO OCCURRENCE OF AN EVENT

1. FIELD OF THE INVENTION

The present invention pertains generally to video image collection. More particularly, the present invention relates to methods and apparatus for detecting and reacting to change in a field of view of a video camera.

2. BACKGROUND

Casinos are multi-billion dollar industries. Even though legalized gambling is a relatively young industry in this country, it continues to grow.

A necessary element for an effective casino operation is an efficient casino management and security system. Casinos spend substantial amounts of money to observe gamblers, dealers and others in the casino, using both electronic surveillance equipment and live personnel. Electronic surveillance usually takes the form of electronic camera globes or visible cameras (collectively cameras) which blanket the walls and ceilings of the casinos. These cameras generate enormous amounts of data, which has conventionally been stored on videotapes for possible later retrieval.

In most instances, cameras are stationed in areas where at least some part of the image frame being taped does not change often. For example, a camera may be stationed outside a vault or door in a stairwell. It is only when an action occurs, such as someone enters the vault or crosses a door in the stairwell that a portion of the image frames changes, and even then other portions of the image frame do not change.

Since the image frames change infrequently, it is desirable to use image compression to lower the transmission and storage requirements. Once image frames have been compressed, it is still desirable to be able to further process the compressed image frames to determine if an event has occurred.

For example, it is desirable to be able to detect that the image frames have changed due to a change in the field of view (e.g., someone crossing through the field of view) without having to decompress the previously compressed image frames. The present invention provides a mechanism for detecting that a change in the field of view previously occurred in the data associated with sequentially stored frames without having to decompress image frames and also provides several mechanisms for reacting to the detection of the change.

3. SUMMARY

A method of detecting an occurrence of an event that exists within a sequence of stored frames relating to a scene is described, as well as methods that operate upon the data relating to the scene once an event is detected.

The method of detecting occurrence of an event includes comparing a first stored frame to a later stored frame to determine whether a change in size between the frames exists that is greater than a predetermined threshold. In a preferred embodiment, the first and later stored frames are compressed, and operated upon while compressed to determine the occurrence of an event.

Methods of operating upon the data relating to the scene once an event is detected include providing a still image at intervals, typically every 5–10 frames using the data from at least the recording device that detected the event. In a further embodiment, still images from other recording devices that are associated in a predetermined manner with the recording device that detected the event are also obtained at intervals.

4. BRIEF DESCRIPTION OF THE DRAWINGS

The present invention is illustrated by way of example, and not limitation, in the figures of the accompanying drawings in which like references denote similar elements, and in which.

5. DETAILED DESCRIPTION OF THE PREFERRED EMBODIMENTS

Methods and apparatus for detecting and reacting to a change in the field of view of a video camera whose output is digitized, and typically compressed, are described. In the following description, for purposes of explanation, numerous specific details are set forth in order to provide a thorough understanding of the present invention. It will be evident, however, to one skilled in the art that the present invention may be practiced in a variety of compressed data systems in which the occurrence of an event is reflected in the size of the compressed data. In other instances, well-known operations, steps, functions and elements are not shown in order to avoid obscuring the invention.

Parts of the description will be presented using terminology commonly employed by those skilled in the art to convey the substance of their work to others skilled in the art, such as compression, pattern recognition, frames, images, field of view, and so forth. Various operations will be described as multiple discrete steps performed in turn in a manner that is most helpful in understanding the present invention. However, the order of description should not be construed as to imply that these operations are necessarily performed in the order that they are presented, or even order dependent. Lastly, repeated usage of the phrases "in one embodiment," "an alternative embodiment," or an "alternate embodiment" does not necessarily refer to the same embodiment, although it may.

Figure 1:
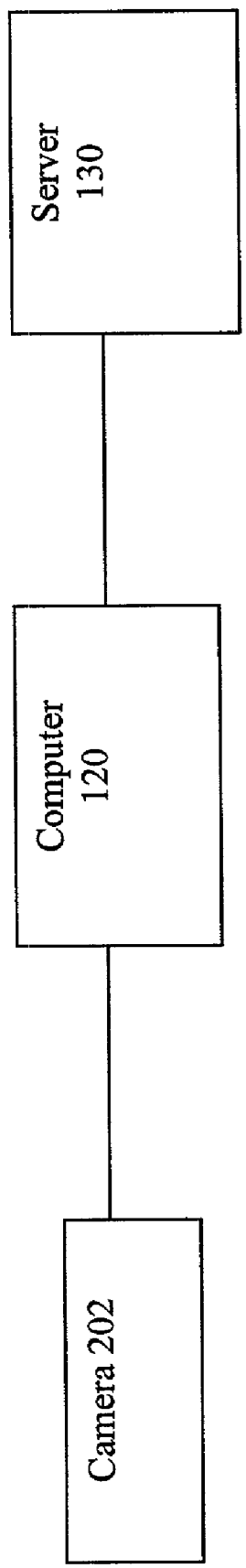
FIG. 1 illustrates an exemplary system according to the present invention, and various different devices that will allow for the various permutations described herein to be understood, although it is understood that this exemplary system should not be construed as limiting the present invention.

FIG. 1 illustrates an exemplary system 100 according to the present invention, which is shown as having a computer 120 that compresses and operates upon digitized data using the features of the present invention described herein. Computer 120 may also operate to compress the digitized data and transmit it to another device, shown as a server 130, so that server 130 operates upon digitized data using the features of the present invention described herein. While compression may be achieved by computer 130, practically this is not efficient. A number of computers 120 are shown as providing digitized data to server 130, which aspect is illustrated in order to explain further how various related streams of digitized data can be operated upon according to one embodiment of the present invention, as described hereinafter.

While the system as described above illustrates one manner in which the advantages of the present invention described herein can be used, this is exemplary. For example, the computers 120 and 130 could be implemented as a network of computers or as a device other than a computer that contains a processor that is able to implement the inventions described herein. Many other variants are possible. And while a device such as mentioned will typically include a processor of some type, such as an Intel Pentium 4 microprocessor or a DSP in conjunction with program instructions that are written based upon the teachings herein, other hardware that implements the present invention can also be used, such as a field programmable gate array. The program instructions are preferably written in C++ or some other computer programming language. For repetitive routines that are used repeatedly, these can be written in assembler for faster processing. As mentioned above, the present invention operates upon data preferably formatted into a matrix array within a frame, as described further hereinafter. For data that is not temporally related, the blocks can be formatted into frames that may or may not have the ability to store the same amount of data. For data that is temporally related, such as image and audio data, each image and its related audio data will preferably have its own frame, although that is not a necessity, since image and audio data can be stored on separate tracks and analyzed independently.

According to one embodiment, the computer 120 or server 130 is assumed to have received digital image/audio frames that relate to a sequence, which sequence has been digitized into frames and compressed in some manner. These frames may be compressed in essentially real-time and operated upon, or compressed and transmitted for storage to in another location. Further, there are situations when compression is unnecessary, such as if pattern recognition between frames is performed during substantially real time operations on frames.

In some instances, the data obtained corresponds to locations where the scenes being monitored and stored do not change often. For example, a camera may be stationed outside a vault or door in a stairwell and record the scene, which is then received by the computer 100. It is only when, someone enters the vault or crosses a door in the stairwell that the image frame changes substantially (since even between sequential frames that record the same scene, changes in the data representing the frame will exist due to at least noise effects).

For image frames corresponding to the scene that have been compressed, it is desirable to be able to further operate upon the compressed image frames, for example, to determine if an event has occurred in the image frames. For example, it is desirable to be able to detect that the image frames have changed due to a change in the field of view (e.g., someone crossing through the field of view) without having to decompress the images. The present invention provides a mechanism for detecting that a change has occurred in the field of view without having to decompress image frames and also provides several mechanisms for reacting to the detection of the change.

Figure 2:
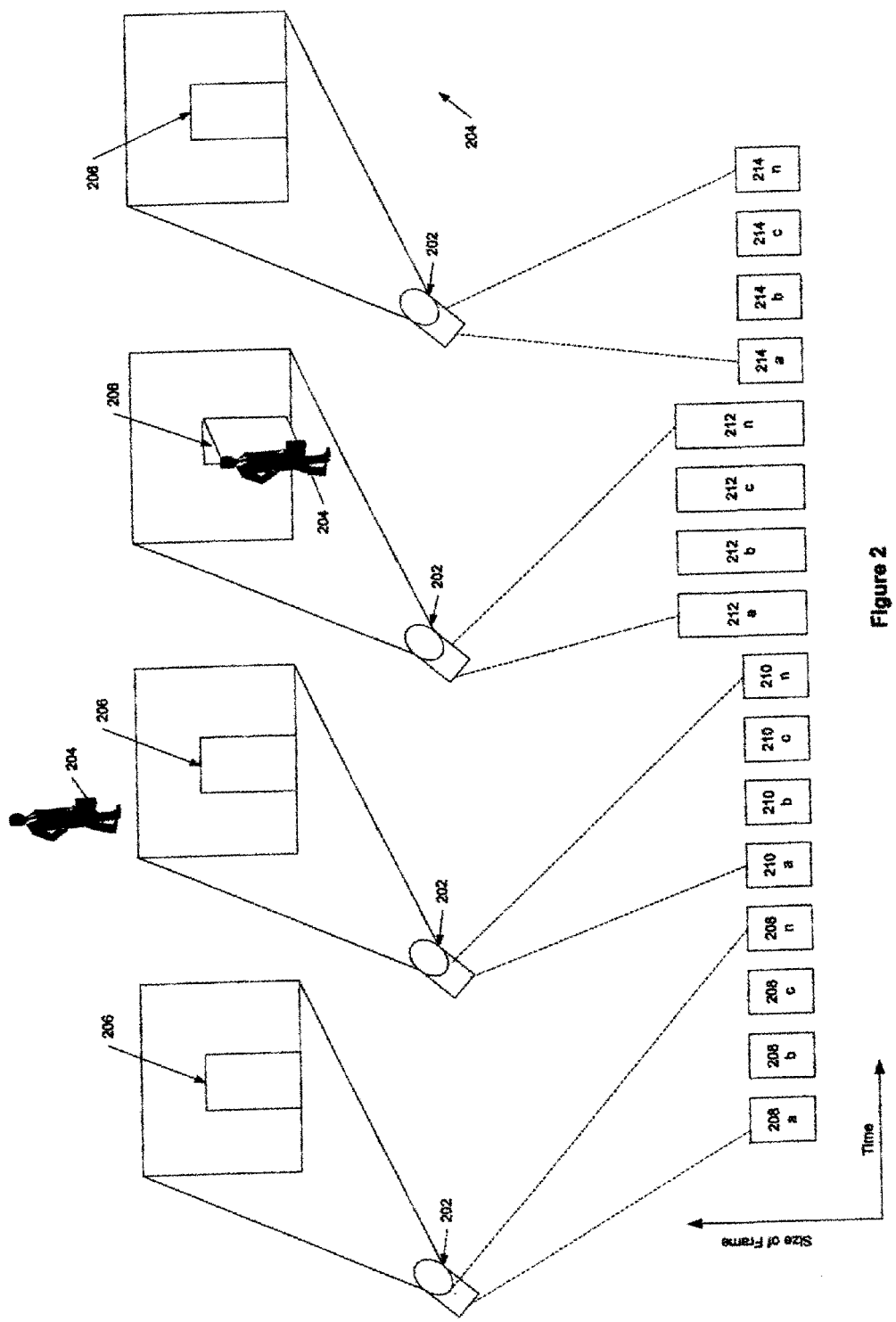
FIG. 2 illustrates compressed frames produced by a camera which has an object pass through its field of view.

FIG. 2 illustrates compressed frames that have been produced by a camera that has had an object pass through its field of view. Camera 202 is pointed at doorway 206 in a stairwell and a computer (not shown) attached to camera 202 such as computers 120 of FIG. 1 produces a sequence of digitized and compressed frames 208$a$–$n$, 210$a$–$n$, 212$a$–$n$, and 214$a$–$n$. Compression can be achieved using the techniques described in U.S. patent application bearing Ser. No. 09/999,776 entitled "Method And Apparatus For Determining Patterns Within Adjacent Blocks of Data" filed on Oct. 31, 2001 and assigned to the assignee of the present application, and application Ser. No. 09/727,096 entitled "Method And Apparatus For Encoding Information Using Multiple Passes And Decoding In A Single Pass" filed on Nov. 29, 2000 and assigned to the assignee of the present application, both of which are expressly incorporated herein by reference. It is noted that when using these techniques, particularly for pattern recognition, that rotational and diagonal traversals of search blocks are typically not necessary, particularly when a camera is fixed in position.

Whether the frames 208$a$–$n$, 210$a$–$n$, 212$a$–$n$, and 214$a$–$n$ are operated upon in essentially real-time, stored and operated upon, compressed and then operated upon, compressed, stored and then operated upon, or compressed, transmitted, stored at another location and then operated upon, the inventions described herein are equally applicable. For a still scene having a sequence of frames, the uncompressed frames will have a certain relatively constant size, whether it has been compressed or not, and whether there is action or movement or not, because the same number of bits is used to represent the frame. Once compressed, however, the amount of data needed to represent each frame that is of the same scene will be substantially less than the same scene that also has other objects superimposed thereon, and that compressed scene will compress to roughly the same size, though there will be some non-uniformity due to noise and other factors. Thus, as shown in FIG. 2, the compressed frames of 212$a$–$n$ are larger than the compressed frames 208$a$–$n$ and 210$a$–$n$ because person 204 has entered through doorway 206. When person 204 leaves the field of view of camera 202, the size of compressed frames return to the previous relatively small size, as shown in frames 214$a$–$n$.

Figure 3A:
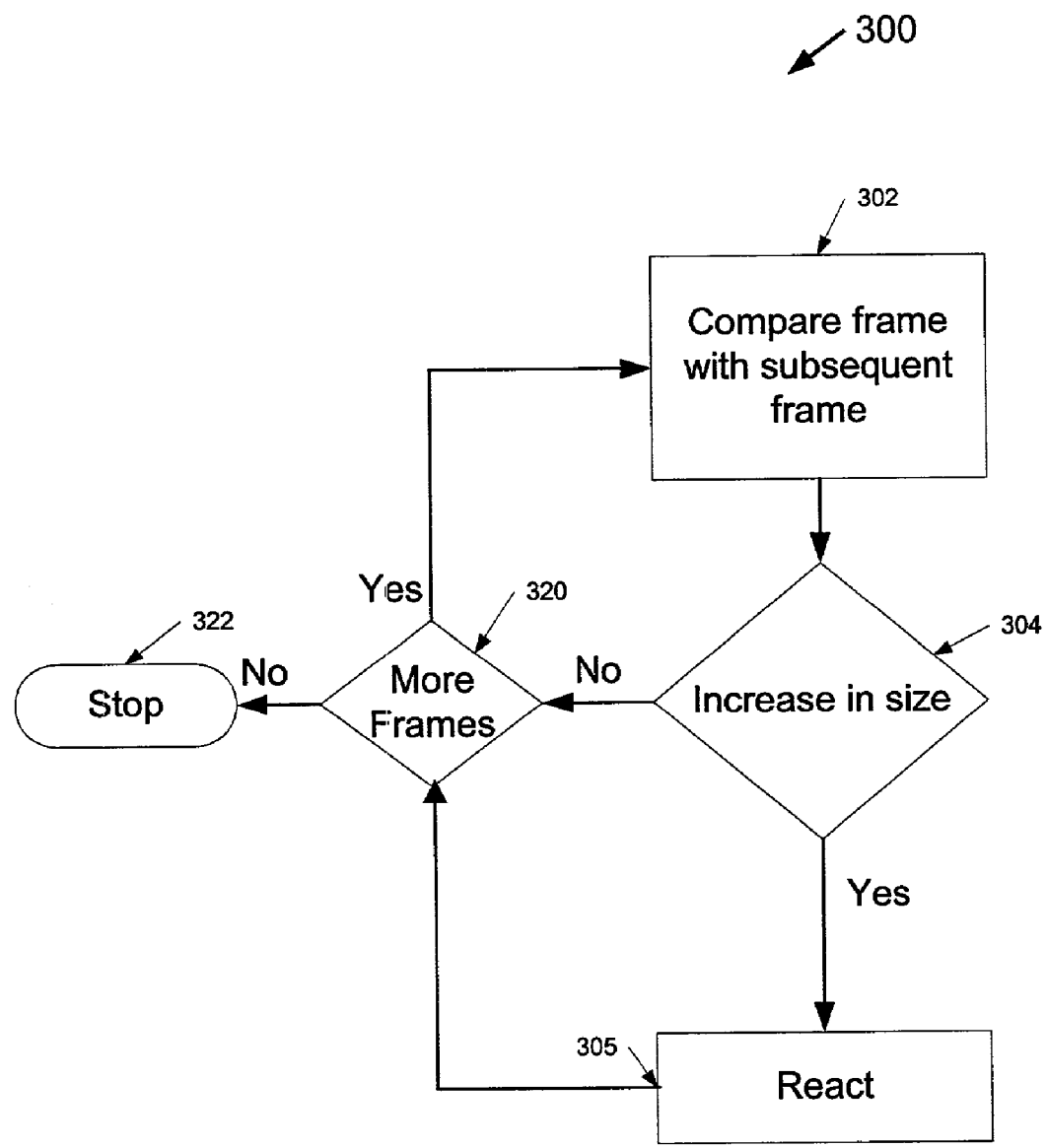
FIG. 3a illustrates a process for detecting and reacting to a change in the size of frames of a source.
Figure 3B:
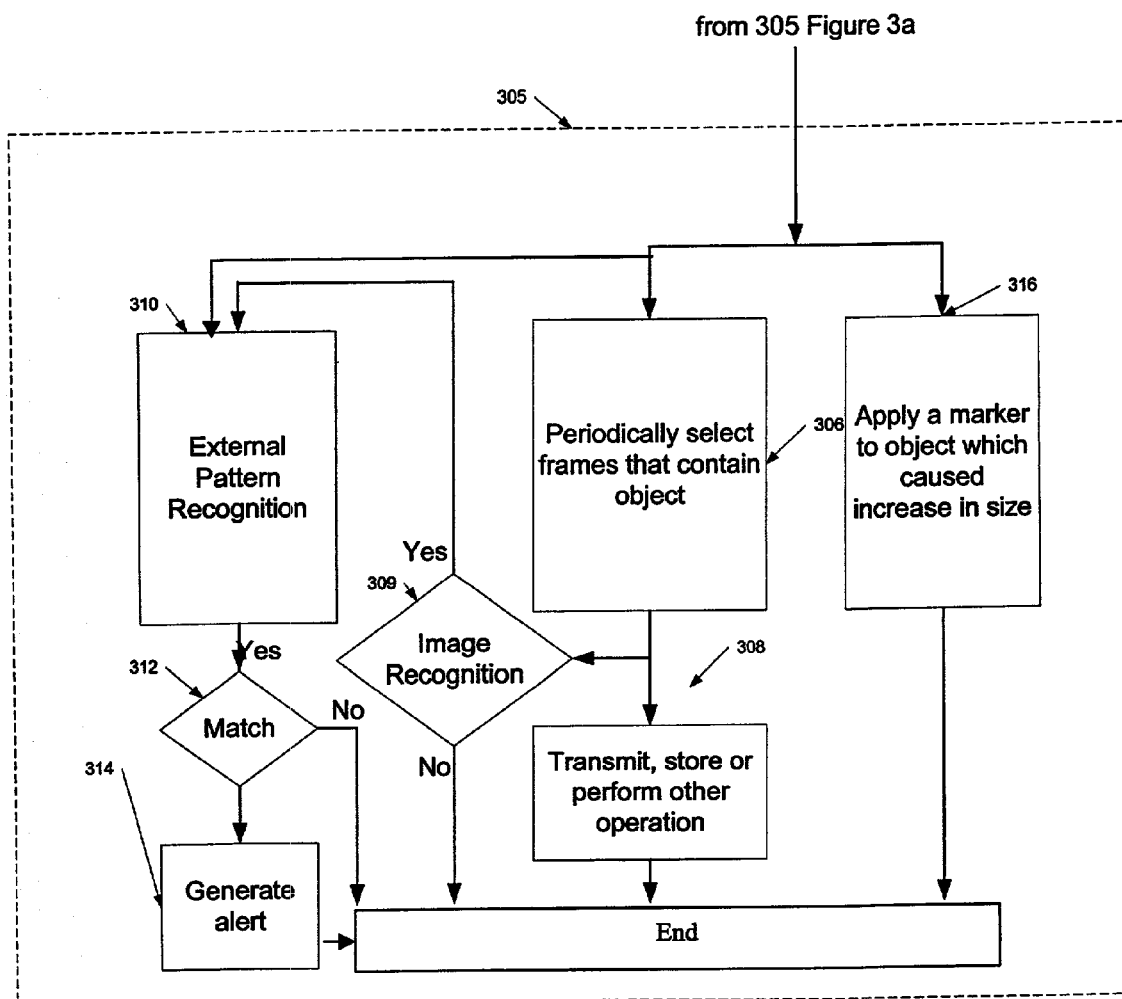
FIG. 3b illustrates several possible examples of operations that can be performed in reaction to the detection of an occurrence of an event according to an embodiment of the present invention.

FIG. 3$a$ illustrates a process 300 for detecting and reacting to a change in the size of compressed frames obtained from the same source. It should be appreciated that present invention is not limited to compressed video frames. Even though above the frames have been described in the context of video data the frames could be audio data or a mixture of audio and video data or even another form of data that provides an indication of the occurrence of an event. According to one embodiment, process 300, operates on compressed video frames from the field of view of a camera which has an initial period of substantially no activity in the field of view followed a period of activity caused by an object which enters the field of view causing a change in the size of the compressed video frames. Each of the frames is preferably stored in compressed form as a block of data that has a size associated with it. In process 300, for each frame, it is determined at step 320 whether there are more following frames to process. If not, then process 300 stops at step 322. If there are, for another frame, the size of adjacent compressed frames is compared in step 302. If the subsequent frame is greater 304 than the previous frame by a certain threshold, a react step 305 follows to indicate detection of the occurrence of the event.

FIG. 3$b$ illustrates several possible examples of operations that can be performed in reaction to the detection of an occurrence of an event according to an embodiment of the present invention. Specifically, as shown in FIG. 3$b$ one or more of three possible operations 306, 310, 316 can be performed as a result of an event occurring, as determined by step 305.

If there was an event determined, operation 306 can be instituted, which will cause a sequence of still images, obtained at some interval from each other that follow the initiation of the event to be obtained. These still frames represent a significant reduction from the total number of frames that a particular camera has obtained. By making the interval between every $4^{th}$ to $10^{th}$ frame, preferably every $6^{th}$ frame, one of the still images obtained will contain a "best view" of the object that has caused the increase in size of the compressed frame. With each still frame obtained, operations can be performed, such as transmitting, via email or other transmission mechanism shown in step 308, each still image to a predetermined location. If desired, image recognition can be performed on each still image, as shown by step 309 indicating that the still frame should be processed for external pattern recognition of an object, such as a person or article, as performed in and described by step 310, detailed hereinafter.

The step 310 external pattern recognition is directed to looking for previously obtained external patterns within either compressed or uncompressed data representing frames. This pattern recognition is shown as being initiated by step 305 after a compressed frame has been acted upon, which is preferred for previously compressed data, since external pattern recognition need not be performed on frames that have roughly the same size that indicates no motion is taking place. For frames that have not been compressed, external pattern recognition can occur on the uncompressed data that is being searched for to determine if external patterns of significance exist therein, using techniques such as described in U.S. patent application entitled "Method And Apparatus For Determining Patterns Within Adjacent Blocks of Data" filed on Oct. 31, 2001 and mentioned above, with at least one separate thread preferably being initiated for each different external pattern that is being searched for, and instead of a reference frame being used to obtain search blocks, the external pattern is used to obtain search blocks that are searched for in the target frame. Of course, other conventional pattern recognition techniques can be used.

The external patterns of interest are contained in a table of preferably both uncompressed and compressed files, and which of the files being used will depend upon whether pattern recognition will be made based upon uncompressed data or compressed data, respectively. The compressed objects of interest are stored using the same compression technique that is used to obtain compression of the frames, thus allowing for more efficient pattern recognition.

If as a result of the external pattern matching a match is found to exist, as shown by step 312, a match indication will cause an alert of some type to be generated in step 314. This can occur at either computer 120 or server 130. An alert can be for example, an indication on the monitor of a security guard or other authority indicating the identity of the person identified by the external pattern recognition or the location of the event, or it could be an audible alert over a wireless radio to a security guard to confront someone with a certain description at a certain location. An example of an alert will be described in connection with FIG. 4 below.

Additionally or alternatively, process 300 allows a security guard observing the field of view of the camera on a monitor to tag or mark an object/person that caused the change in the size of the frames so as to permit easy following of the person as the person navigates in front of the camera and appears on the monitor, as shown by step 316. Different shapes and colors of tags can be used to differentiate between different levels of scrutiny that should be applied to each object. For example, one shaped object, such as a triangle, can be used to designate an external pattern that has a high priority, whereas another shaped object, such as a circle, can be used to designate an external pattern that has a low priority. Similarly, or in combination with the shapes being used, one color, such as red, can be used to designate a different high priority, and another color, such as green, can be used to designate a different low priority.

Figure 4:
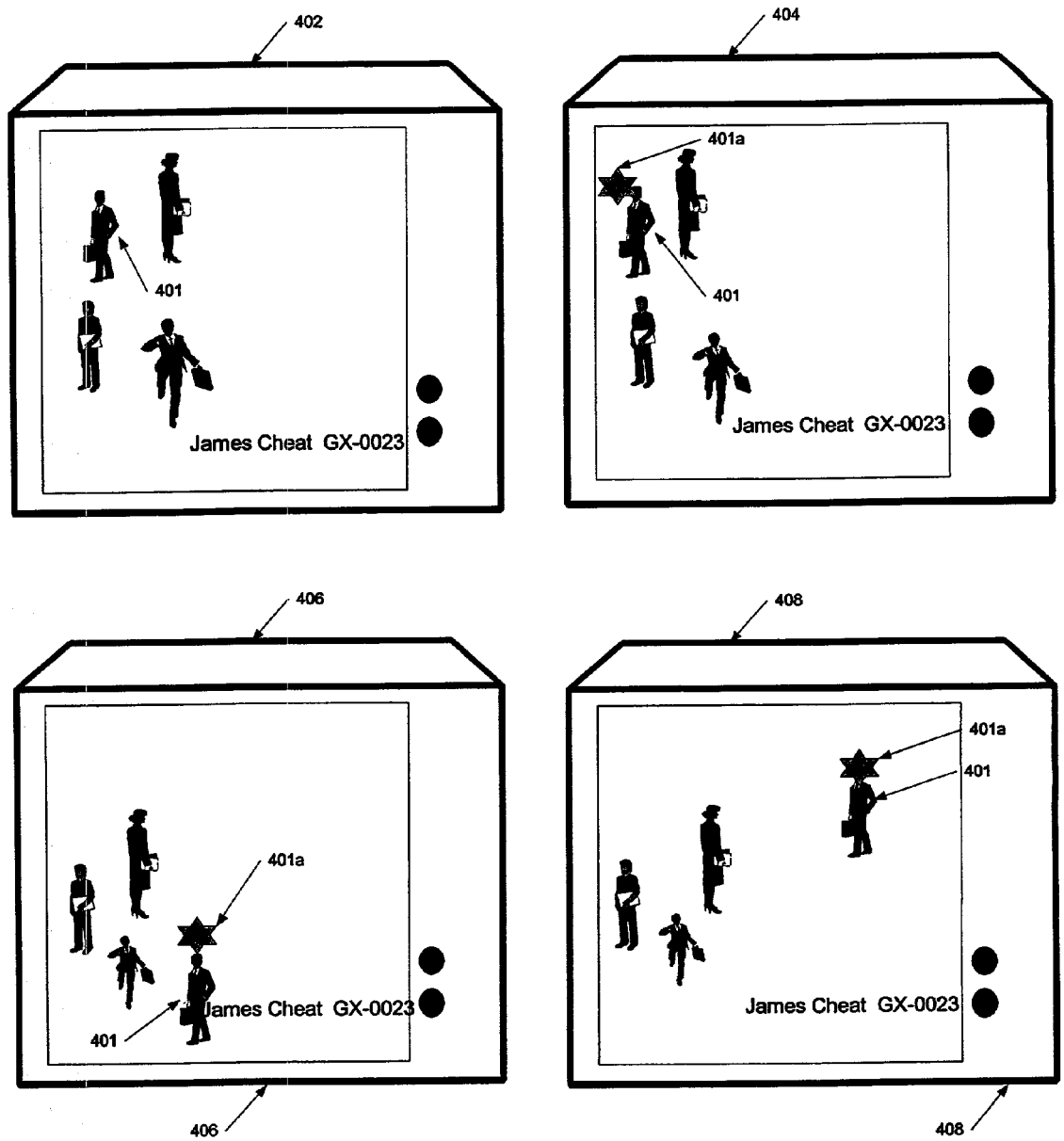
FIG. 4 illustrates four screen displays in which a person caused a change in the size of frames to occur.

Once an object of interest is located, tagging that object can be used to cause the marker to appear adjacent to the image. Of course, this feature can be turned off if desired. FIG. 4 illustrates in greater detail a technique for facilitating following an image of an object, such as a person, among a group of objects displayed on a monitor by marking the image of the object on the monitor with a tag or mark. FIG. 4 illustrates four screen displays 402, 404, 406, 408 in which an object caused a change in the size of frames to occur. In screen display 404 a tag 401a is attached to the image of person 401. As the image of person 401 moves from display 404, to display 406, and then display 408, tag 401a facilitates observance of where the image of person 401 is on the display.

Displays 402, 404, 406, and 408 also show in a corner of the display an alerts region. As described in connection with FIG. 3, according to one embodiment, a visual alert is generated when the external pattern recognition process 310 that produces an indication that a match has occurred, and identifies both the match name, in this case a person's name, and the location where the match occurred, thus describing the identity and location of the object identified.

Thus, methods and apparatus for external pattern recognition have been described. Although the present invention has been described with reference to specific exemplary embodiments, it will be evident to one of ordinary skill in the art that various modifications and changes may be made to these embodiments without departing from the broader spirit and scope of the invention as set forth in the claims. Accordingly, the specification and drawings are to be regarded in an illustrative rather than a restrictive sense.

I claim:

1. A method of detecting occurrence of an event, the method comprising:

comparing a first compressed digital frame size to a later compressed digital frame size in a sequence of compressed digital image frames to determine whether a change in size exists that is greater than a predetermined amount, and, if the change in size is greater than the predetermined amount, using that determination to indicate the occurrence of the event, wherein the occurrence of the event is an appearance of a new object in the later compressed frame;

periodically selecting a frame in the sequence of compressed frames after the occurrence of the event and transmitting each selected frame, wherein the step of periodically selecting selects at least one of every 10 adjacent frames during the occurrence of the event; and performing external pattern recognition on the selected frame using an external pattern.

2. A method of detecting occurrence of an event, the method comprising:

comparing a first compressed digital frame size to a later compressed digital frame size in a sequence of compressed digital image frames to determine whether a change in size exists that is greater than a predetermined amount, and, if the change in size is greater than the predetermined amount, using that determination to indicate the occurrence of the event, wherein the occurrence of the event is an appearance of a new object in the later compressed frame, and performing external pattern recognition on the later compressed frame using an external pattern and further comprising generating an alert when the external pattern recognition matches the external pattern to the new object.

3. The method of claim 2, wherein the alert includes a visual alert indicating identity of the new object.

4. The method of claim 2, wherein the alert includes an audible alert.

5. The method of claim 2, further comprising placing a tag on an image of the new object that is displayed on a monitor such that the tag facilitates following the image on the monitor as the new object moves on the monitor.

6. The method of claim 2, wherein the first compressed digital frame provides an image of a stationary scene that does not contain movement therein and the later compressed digital frame includes a new object, indicating movement occurring within the scene.

7. The method of claim 6, further comprising periodically selecting a frame in the sequence of compressed frames after the occurrence of the event and transmitting each selected frame.

8. The method of claim 7, wherein the step of periodically selecting selects at least one of every 10 adjacent frames during the occurrence of the event.

* * * * *